US010492565B2

(12) United States Patent
Cass et al.

(10) Patent No.: US 10,492,565 B2
(45) Date of Patent: Dec. 3, 2019

(54) FOOTWEAR WITH IMPROVED TRACTION

(71) Applicant: Wolverine Outdoors, Inc., Rockford, MI (US)

(72) Inventors: William J. Cass, Belmont, MI (US); Clark A. Matis, Durango, CO (US); David W. Filar, Worcester, MA (US)

(73) Assignee: Wolverine Outdoors, Inc., Rockford, MI (US)

( * ) Notice: Subject to any disclaimer, the term of this patent is extended or adjusted under 35 U.S.C. 154(b) by 62 days.

(21) Appl. No.: 15/976,999

(22) Filed: May 11, 2018

(65) Prior Publication Data

US 2019/0104806 A1 Apr. 11, 2019

Related U.S. Application Data

(63) Continuation-in-part of application No. 29/621,331, filed on Oct. 6, 2017, now Pat. No. Des. 853,097.

(51) Int. Cl.
| | |
|---|---|
| *A43C 15/06* | (2006.01) |
| *A43B 13/22* | (2006.01) |
| *A43B 13/12* | (2006.01) |
| *A43B 5/00* | (2006.01) |
| *A43B 13/04* | (2006.01) |
| *A43B 13/18* | (2006.01) |
| *A43B 13/02* | (2006.01) |
| *A43C 15/16* | (2006.01) |

(Continued)

(52) U.S. Cl.
CPC ............. *A43B 13/223* (2013.01); *A43B 5/00* (2013.01); *A43B 13/026* (2013.01); *A43B 13/04* (2013.01); *A43B 13/122* (2013.01); *A43B 13/181* (2013.01); *A43C 15/061* (2013.01); *A43C 15/168* (2013.01); *A43B 13/40* (2013.01); *B32B 5/32* (2013.01); *B32B 2266/0221* (2013.01); *B32B 2437/02* (2013.01)

(58) Field of Classification Search
CPC ......... A43C 13/00; A43C 13/04; A43C 15/16; A43C 15/168; A43C 15/061; A43B 13/181; A43B 13/00
USPC ....................................... 36/132, 59 C, 59 R
See application file for complete search history.

(56) References Cited

U.S. PATENT DOCUMENTS

| | | | | |
|---|---|---|---|---|
| 4,083,125 | A | * | 4/1978 | Benseler .................. A43B 5/10 36/32 R |
| 4,141,158 | A | * | 2/1979 | Benseler .............. A43B 13/223 36/32 R |

(Continued)

*Primary Examiner* — Marie D Bays
(74) *Attorney, Agent, or Firm* — Warner Norcross + Judd LLP

(57) ABSTRACT

An article of footwear includes an outsole having first and second treads constructed from a first material and defining first and second ground contacting surfaces. The second tread includes a layer of a second material below the first material, the second material being less abrasion resistant than the first material. The second ground contacting surface of the second tread extends below the first ground contacting surface of the first tread. The second tread is configured to move upward when the second ground contacting surface engages a ground surface to distribute a ground force upon both the first tread and the second tread. The second material of the second tread is abraded by the ground surface less than it would have been had the second tread remained at the second distance upon application of the ground force.

19 Claims, 9 Drawing Sheets

(51) Int. Cl.
*A43B 13/40* (2006.01)
*B32B 5/32* (2006.01)

(56) References Cited

U.S. PATENT DOCUMENTS

| | | | | |
|---|---|---|---|---|
| 4,161,828 A | * | 7/1979 | Benseler | A43B 5/10 36/32 R |
| 4,624,062 A | * | 11/1986 | Autry | A43B 13/223 36/114 |
| 5,077,916 A | * | 1/1992 | Beneteau | A43B 5/001 36/128 |
| 5,201,126 A | * | 4/1993 | Tanel | A43B 3/0042 36/134 |
| 5,216,824 A | | 6/1993 | Blissett et al. | |
| 5,768,802 A | * | 6/1998 | Bramani | A43B 7/146 36/28 |
| 5,987,782 A | | 11/1999 | Bramani | |
| 6,029,377 A | * | 2/2000 | Niikura | A43B 13/223 36/59 C |
| D520,220 S | | 5/2006 | Morgan et al. | |
| 7,313,875 B2 | | 1/2008 | Morgan | |
| 7,610,695 B2 | * | 11/2009 | Hay | A43B 7/14 36/114 |
| 7,802,379 B2 | * | 9/2010 | Gerber | A43B 5/02 36/134 |
| 7,827,705 B2 | * | 11/2010 | Baucom | A43B 13/026 36/134 |
| 8,375,604 B2 | * | 2/2013 | Eder | A43B 13/26 36/114 |
| D801,658 S | | 11/2017 | Huard et al. | |
| 2005/0268490 A1 | * | 12/2005 | Foxen | A43B 7/1425 36/28 |
| 2007/0136960 A1 | * | 6/2007 | Doerer | A43B 13/02 12/146 B |
| 2009/0100716 A1 | * | 4/2009 | Gerber | A43B 5/02 36/114 |
| 2010/0077635 A1 | * | 4/2010 | Baucom | A41D 13/065 36/61 |

\* cited by examiner

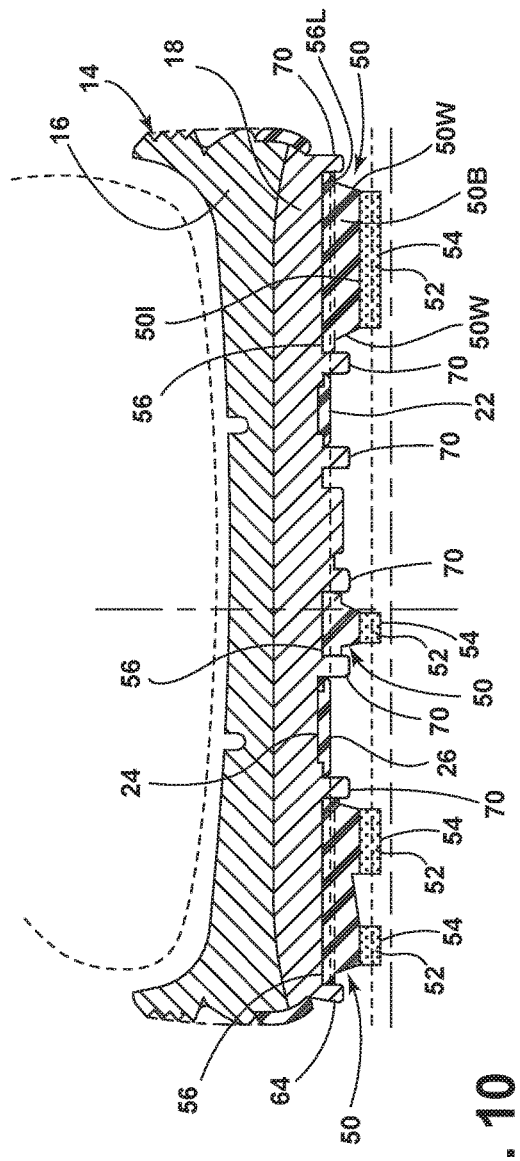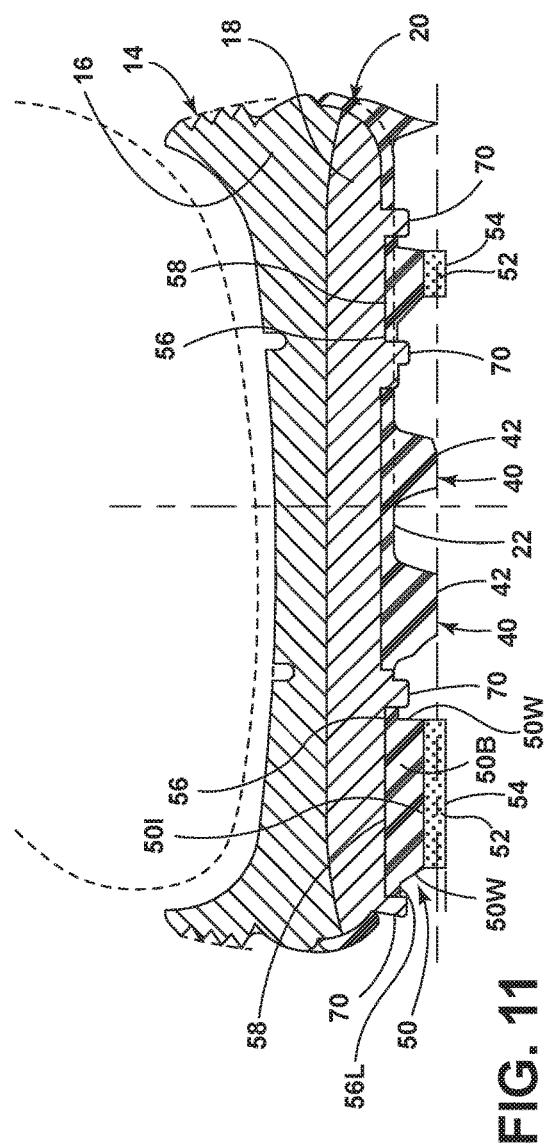
FIG. 10
FIG. 11

FOOTWEAR WITH IMPROVED TRACTION

BACKGROUND OF THE INVENTION

The present invention relates to footwear, and more particularly to footwear having improved traction for use on icy or slippery surfaces.

An outsole of a shoe is designed to provide certain functionality. It provides a stable platform for the wearer's foot, and underfoot protection. An outsole also provides traction between the shoe and an underfoot surface to enable the wearer to propel, brake and change direction on the surface. Outsoles typically are durable and resist wear abrasion in order to provide the user with a reasonable outsole life. Many sport shoe outsoles are made from rubber which is resilient and has a relatively high coefficient of friction on dry surfaces. Other outsoles are made of polyurethane plastic, which is slightly harder, yet provides increased wear resistance. Outsoles of this kind, however, can lack traction on certain types of surfaces.

A variety of outdoor activities involve navigating over icy terrain or frozen bodies of water, which can present difficulties where footwear does not have sufficient traction. The technical performance of footwear for such activities is largely dependent on the outsole of the footwear. Accordingly, hiking and sport shoes often worn during such outdoor activities are designed for wear on slippery surfaces such as wet ground, snow, or ice and typically have soles made of hard, heavy, waterproof material, such as rubber or plastic. The outsoles for such shoes and boots often include ground engaging elements such as treads and/or spikes which provide certain ground-engaging characteristics that improve traction on slippery surfaces. Some of these features, however, can cause the sole to become more rigid and less flexible. Other footwear soles can include siping, which can improve traction on flat, wet surfaces, such as a boat deck or dock, but usually does not significantly enhance traction on uneven surfaces such as rocks, uneven surfaces, or ice.

Accordingly, there remains room for improvement in the area of footwear to provide high traction for traversing wet, slippery, and/or icy terrain or other surfaces while providing good wear resistance.

SUMMARY OF THE INVENTION

Footwear includes an upper and an outsole having first and second treads constructed from a first material and defining first and second ground contacting surfaces. The second tread includes a layer of a second material below the first material, the second material being less abrasion resistant and providing more traction on slippery surfaces than the first material. The second ground contacting surface of the second tread extends below the first ground contacting surface of the first tread. The second tread is configured to move upward when the second ground contacting surface engages a ground surface to distribute a ground force upon both the first tread and the second tread. The second material of the second tread is abraded by the ground surface less than it would have been had the second tread not moved upward but remained at the second distance upon application of the ground force.

In another embodiment, the article of footwear includes an upper, a midsole, and an outsole. The outsole includes first and second treads constructed from a first material having a first coefficient of static friction. The first treads define a first ground contacting surface. The second treads include a layer of a second material below the first material. The second material has a second coefficient of static friction and defines a second ground contacting surface. The second coefficient of static friction is greater than the first coefficient of static friction, and the second ground contacting surface is disposed about 0.1 mm to 5.0 mm below the first ground contacting surface. Due to the weight of a wearer of the article of footwear, the second treads compress the midsole in at least an area above the second treads until the second ground contacting surface is moved up to where the second ground contacting surface is substantially 0 mm below the first ground contacting surface.

In another embodiment, the article of footwear includes an arrangement of treads including first treads interspersed amongst second treads. A plurality of channels are recessed into a lower surface of the outsole, and one of the channels surrounds an upper end of each of the second treads. The first treads are constructed from a first material and define a first ground contacting surface. The second treads are constructed from the first material and include a layer of a second material below the first material; the second material defines a textured traction surface and a second ground contacting surface. The second ground contacting surface is disposed 0.1 mm to 5.0 mm below the first ground contacting surface. Due to the weight of a wearer of the footwear, when the outsole engages a ground surface, the second treads move upward into the midsole a distance of about 0.1 mm to 5.0 mm, compressing the midsole in at least an area above the second treads. The second treads move upward until the second ground contacting surface is substantially level with the first ground contacting surface, thereby distributing a ground force upon both the first treads and the second treads.

According to yet another embodiment, each of the channels surrounding each of the second treads provides localized flexibility to the outsole such that each of the second treads can move upward when the second ground contacting surface engages the ground surface.

In yet another embodiment, the outsole includes a rib extending from the outsole and around each of the second treads.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 10 is a section view of the alternative embodiment, taken along a line in a location similar to line IV-IV of FIG. 1;

FIG. 11 is a section view of the alternative embodiment, taken along a line in a location similar to line V-V of FIG. 1.

DESCRIPTION OF THE CURRENT EMBODIMENTS

Figure 1:
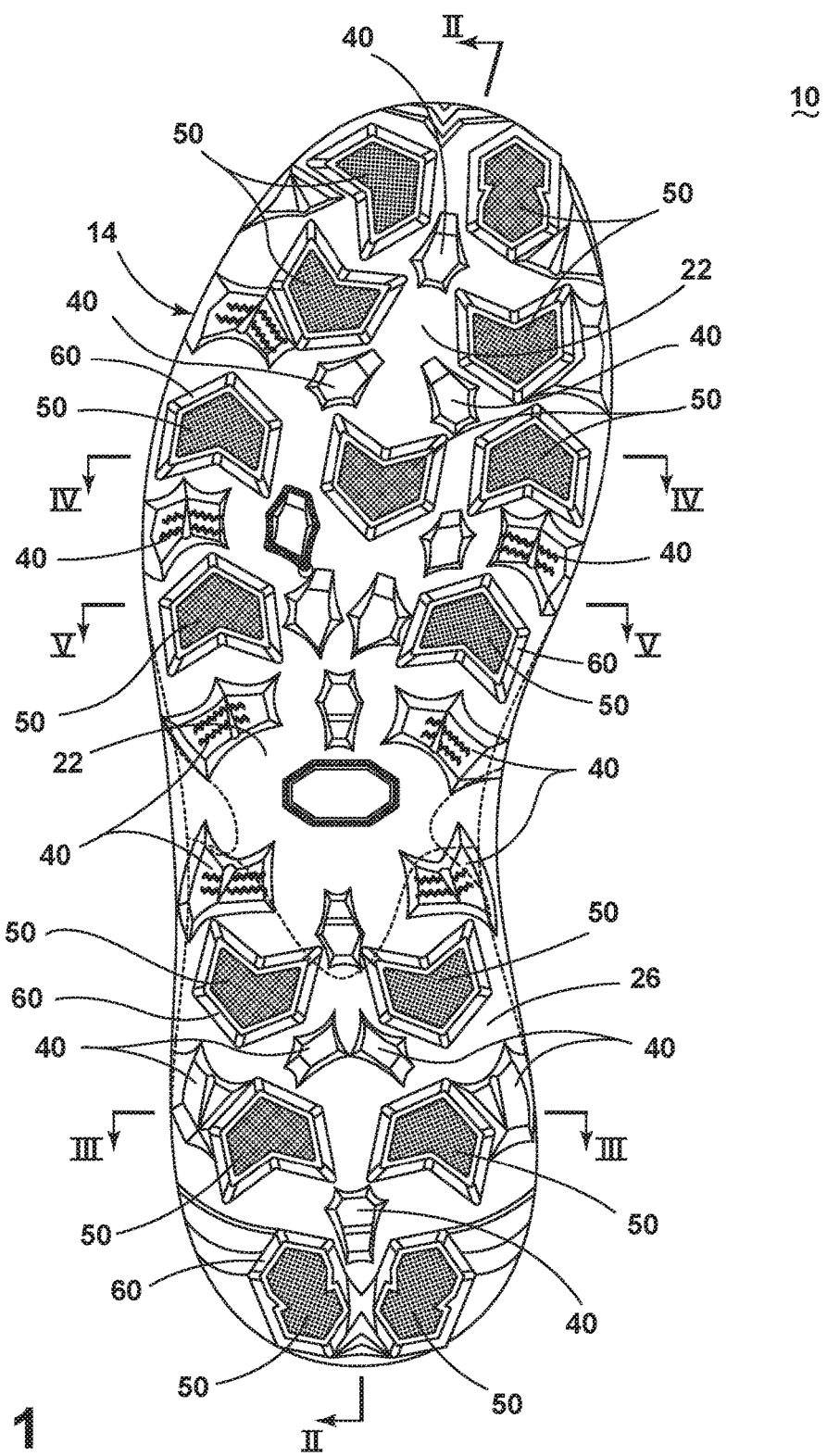
FIG. 1 is a bottom view of an article of footwear including a sole assembly in accordance with a current embodiment.

The current embodiments relate to an improved article of footwear. In these embodiments, the improved article of footwear includes a sole construction configured to provide improved traction for traversing wet, slippery, and/or icy terrain, while providing improved wear resistance for wear on hard surfaces or indoors.

Although the current embodiments are illustrated in the context of an outdoor shoe, they may be incorporated into any type or style of footwear, including performance shoes, hiking shoes, trail shoes and boots, hiking boots, work boots, all-terrain shoes, barefoot running shoes, sneakers, conventional tennis shoes, walking shoes, multisport footwear, casual shoes, dress shoes or any other type of footwear or footwear components. Generally, the shoe is well suited for alpine rock climbs, winter hiking, and traversing icy terrain features or other icy or slippery surfaces. For example, the shoe can be used to navigate icy, snow-covered, and/or slippery surfaces, for example, those in snow covered mountains, or on frozen ponds, lakes, oceans or other water bodies. As used herein, icy terrain features can include, but are not limited to, features of slippery, wet or icy outdoor hiking trails, slippery inclines, and frosted, rocky terrain or other hard surfaces that are generally rough, jagged, and uneven. The shoe is also well suited to provide such properties for those who work outdoors in winter weather where the ground surface can be icy, wet, or otherwise slippery.

It also should be noted that directional terms, such as "vertical," "horizontal," "top," "bottom," "upper," "lower," "inner," "inwardly," "outer" and "outwardly," are used to assist in describing the invention based on the orientation of the embodiments shown in the illustrations. Further, the terms "medial," "lateral" and "longitudinal" are used in the manner commonly used in connection with footwear. For example, when used in referring to a side of the shoe, the term "medial" refers to the inward side (that is, the side facing the other shoe) and "lateral" refers to the outward side. When used in referring to a direction, the term "longitudinal direction" refers to a direction generally extending along the length of the shoe between toe and heel, and the term "lateral direction" refers to a direction generally extending across the width of the shoe between the medial and lateral sides of the shoe. The use of directional terms should not be interpreted to limit the invention to any specific orientation.

An article of footwear in accordance with a current embodiment is shown in FIGS. 1-8 and generally designated 10. The footwear 10 can include a textile upper (not shown) and a sole assembly 14. The upper can be formed from a variety of material elements joined together to cover at least a portion of the wearer's foot. The material elements can be selected based on the intended uses of the article of footwear 10, and can include synthetic textiles, mesh textiles, polymers or leather, for example. The upper is generally constructed to not impede the flexibility of the sole assembly 14, and can include stretchable or elastic material elements. For example, the material elements can include Lycra, Neoprene or Spandex. The upper can include one or more closure elements, including for example shoelaces or hook and loop fasteners. The upper additionally includes an upper opening for receiving the wearer's foot and a lower periphery for attachment to the sole assembly 14.

Figure 2:
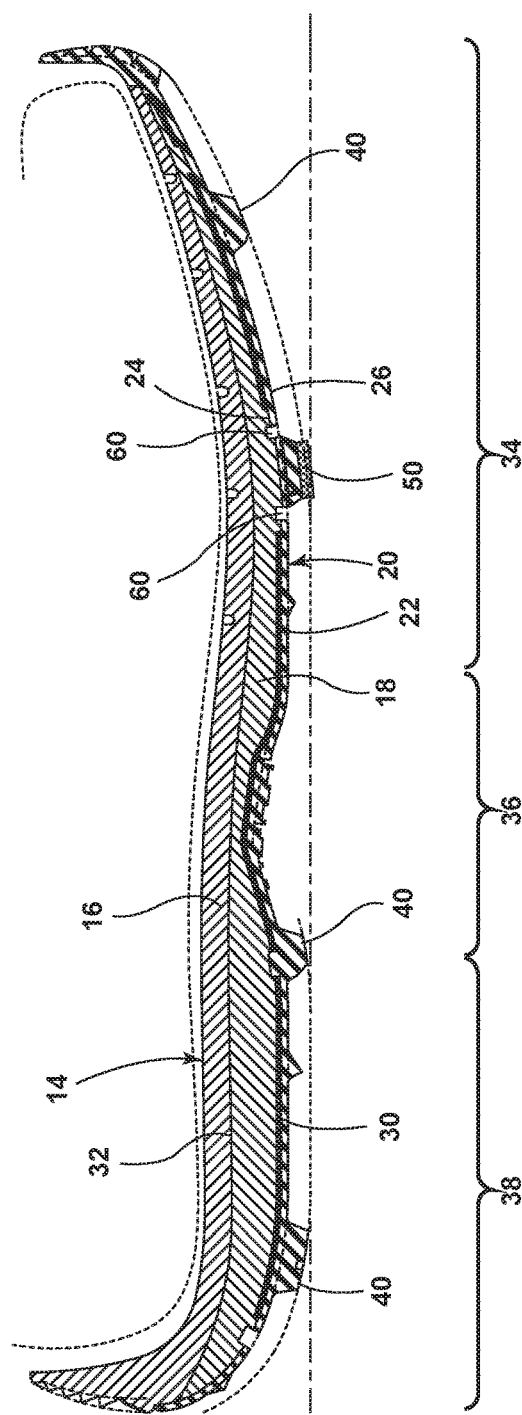
FIG. 2 is a section view of the sole assembly taken along line II-II of FIG. 1.

As shown in FIG. 2, the sole assembly 14 can include a footbed 16, a midsole 18, and an outsole 20, but more or fewer elements of the sole assembly 14 can be included in other embodiments. For example, some embodiments can exclude the footbed, while other embodiments can include only the footbed and an outsole. The sole assembly 14 can include EVA foam with a cushioning top portion and a firmer, wear resistant bottom portion. The components of the sole assembly 14 may individually and/or collectively provide the article of footwear 10 with a number of attributes, such as support, rigidity, flexibility, stability, cushioning, comfort, reduced weight, and/or other attributes. Further, the footbed 16, the midsole 18, and the outsole 20 can define a forefoot region 34, a mid-foot 36 or arch region, and a heel region 38.

The footbed 16 is positioned within the void defined by the upper and is generally non-stretchable and lightweight and is joined to the upper to provide a void for receipt of the wearer's foot. The footbed 16 can be constructed from a sheet of material, such as foam, EVA, PU, latex, gel or other materials, and by virtue of its compressibility, provide cushioning, and may also conform to the foot in order to provide comfort, support, and stability. The thickness of the footbed 16 can vary by region as well. Further, the footbed can be covered with a woven or non-woven fabric, leather, or other material and can be treated with an antimicrobial or other compound to reduce odor and/or deterioration of the footbed. The lower peripheral allowance or edge of the upper can be stitched, cemented, or otherwise fastened to the footbed 16 around the perimeter of the footbed. The sole assembly 14 can be combined with any other type or style of upper construction capable of being suitably joined with the outsole 20, for example a Strobel construction. The joining of the sole assembly/outsole and the upper can be accomplished using adhesives, cement, injection molding, pour molding or any other technique used to join an upper and sole.

Figure 3:
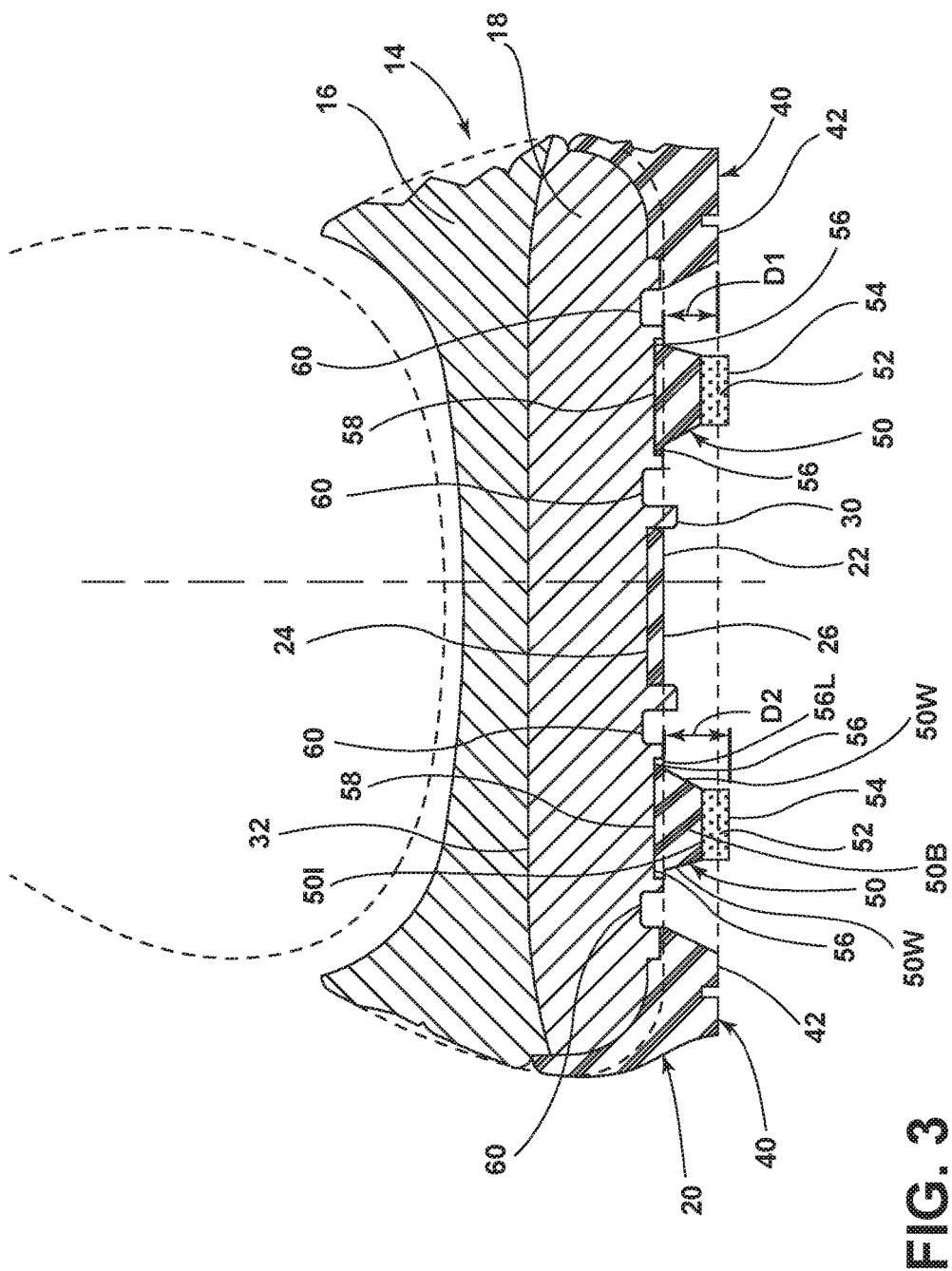
FIG. 3 is a section view of the sole assembly taken along line III-III of FIG. 1, illustrating second treads of the sole assembly disposed in an unloaded position.
Figure 4:
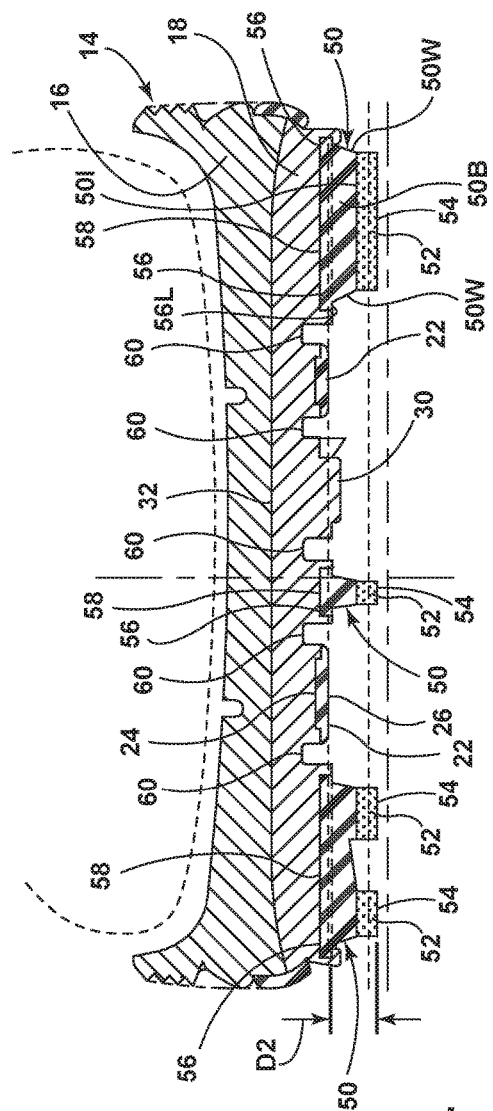
FIG. 4 is a section view of the sole assembly taken along line IV-IV of FIG. 1.
Figure 5:
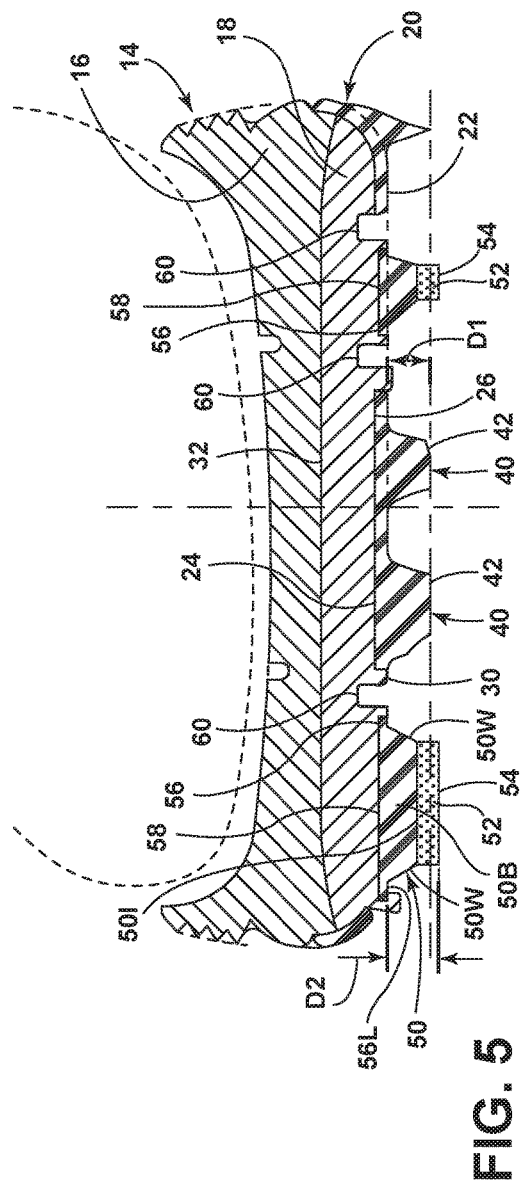
FIG. 5 is a section view of the sole assembly taken along line V-V of FIG. 1.

Referring in particular to FIGS. 3-5, the midsole 18 is positioned below the footbed 16, and includes a lower surface 30, and an upper surface 32. The midsole 18 can be constructed from a material having a density that is generally less dense than the density of the outsole 20; for example, ethyl vinyl acetate (EVA), polyurethane (PU), latex, foam, a gel or other materials. Generally the density of the midsole is such that it compresses relatively easily to provide cushion to the wearer's foot, for example, the heel. The midsole material can have a durometer, optionally about 30 Asker C to about 65 Asker C, further optionally about 42 Asker C to about 48 Asker C, and even further optionally about 45 Asker C or about 43 Asker C. As used herein, "durometer" refers to any standard or other suitable durometer measurement (e.g., Asker C or Shore A durometer hardness value) that provides an indication of hardness and/or flexibility of the material. Generally, lower durometer values indicates a softer/more flexible material and higher durometer values indicate a harder/less flexible material. In general, harder materials have more wear resistance, but they are also less flexible. Conversely, softer materials possess less wear resistance, but are more flexible.

The outsole 20 is generally joined to the upper and disposed below the lower surface 30 of the midsole 18. The outsole 20 includes an upper surface 24 and a lower surface 26, and defines a base 22 on the lower surface 26 of the outsole 20. The base 22 is a generally continuous lower surface of the outsole 20 and substantially surrounds, but does not include, the treads. Optionally, the base 22 can be defined by the lower surface of either the outsole 20 or the midsole 18. The outsole 20 can include multiple treads that extend downward from the base 22, as described further below. The treads can be arranged as desired, and not necessarily in a repeating pattern. The treads can include one or more geometric shapes. The outsole 20 can be constructed from one or more materials, for example, natural or synthetic rubber, thermoplastic polyurethane elastomers (TPU), nylon, polymer blends, wear resistant polymers, elastomers and/or other materials. Other materials, such as fiber-reinforced polymers can be used, which can include epoxy, polyethylene or thermosetting plastic reinforced with carbon, glass and/or aramid fibers for enhanced protection. The outsole material can have a durometer, optionally about 40 Shore A to about 70 Shore A, further optionally about 68 Shore A to 72 Shore A.

The outsole 20 includes multiple treads, and can include multiple first treads 40 and multiple second treads 50, as seen in FIG. 1. The first treads 40 can be interspersed amongst the second treads 50. The treads 40, 50 can be integrally formed with the base 22. The base 22 can be of a preselected thickness, for example 1 mm to about 4 mm, further optionally about 1.5 mm. This thickness can be selected to provide the desired flexibility between individual treads, regions and/or portions of the outsole 20. The first treads 40 can be constructed from a first material having a first durometer and a first coefficient of static friction. Further, a lower surface of the first treads 40 defines a first ground contacting surface 42. The first ground contacting surface 42 is spaced a first distance D1 below the base 22.

The second treads 50 can be constructed of the first material, and further include a first layer 52 disposed below the first material. The first layer 52 defines a second ground contacting surface 54. The second ground contacting surface 54 is spaced a second distance D2 below the base 22. The second distance D2 is greater than the first distance D1. The second distance D2 of the second ground contacting surface 54 can be about 0.1 mm to 5.0 mm greater than the first distance D1 of the first ground contacting surface 42. Optionally the second distance D2 can be about 0.25 mm to 2.5 mm greater that the first distance D1, and further optionally, the second distance D2 can be about 0.5 mm to 1.5 mm greater that the first distance D1. Accordingly, the second ground contacting surface 54 of the second treads 50 extends below the first ground contacting surface 42 of the first treads 40. When the outsole treads 40, 50 are unloaded by the weight of a wearer, the ratio of the first distance D1 relative to the second distance D2 can be optionally at least 1:1.1, further optionally between 1:1.4 and 1:1.8, and even further optionally about 1:1.8.

The second treads 50 can also include a shoulder or flange 56 at the upper end of the tread 50. The flange 56 can follow the shape of the tread 50 generally surrounding the uppermost portion of the tread walls 50W. Indeed, the tread walls 50W can transition to the flange 56, which projects outward from the tread 50 at the upper end of the tread 50. At the lower end of the tread 50, the tread walls 50W can transition to an interface surface 50I. There, the second material is physically and/or chemically bonded and/or attached to the first material and the main body 50B and first layer 52 of the tread 50. The flange 56 can extend a distance beyond the main body 50B of the tread 50 and the walls 50W. The flange 56 can be received in a similar-shaped recess 58 defined by the midsole 18. In some cases, the flange 56 can anchor the tread 50 to the midsole 18. Although not shown, the flange 56 can be overlapped on its lower surface 56L by the material from which the midsole 18 is constructed for secure the tread 50 thereto. As described in greater detail below, the flange 56 can aid in the compression of the midsole 18 when the footwear 10 is loaded as a result of the wearer's weight and contact of the sole assembly 14 with a ground surface.

The first layer 52 defines a lower textured traction surface and is constructed of a second material that has a second durometer, a second coefficient of static friction, and is less abrasion resistant than the first material. The first layer 52 can have a durometer that is greater than the durometer of the first material, optionally about 70 Shore A to about 90 Shore A. The second material can include a rubber, elastomeric and/or polymeric compound having optional filler components dispersed throughout the compound. The filler components, or the material, which can include reinforcing glass fibers, carbon or composite fibers, metal fiber, polymeric fiber, particulate matter and/or combinations thereof to make the second ground contacting surface 54 gritty and/or more abrasive which enhances traction, especially on wet ice and/or slippery or ice covered surfaces. Optionally, the second material can provide the outsole 20 up to three times better traction on wet ice surfaces than ordinary outsoles.

Figure 6:
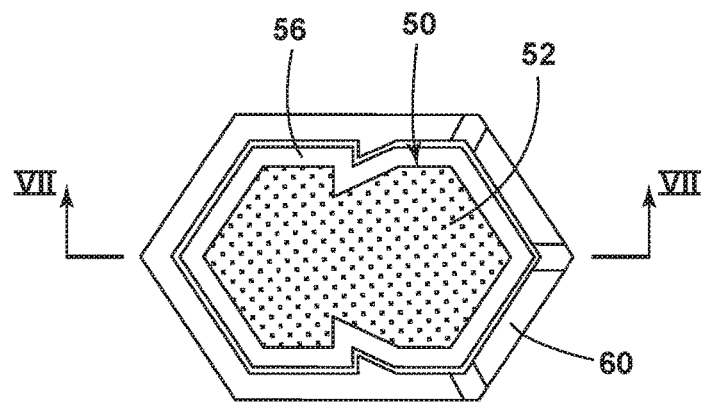
FIG. 6 is a plan view of a second tread of the sole assembly.
Figure 7:
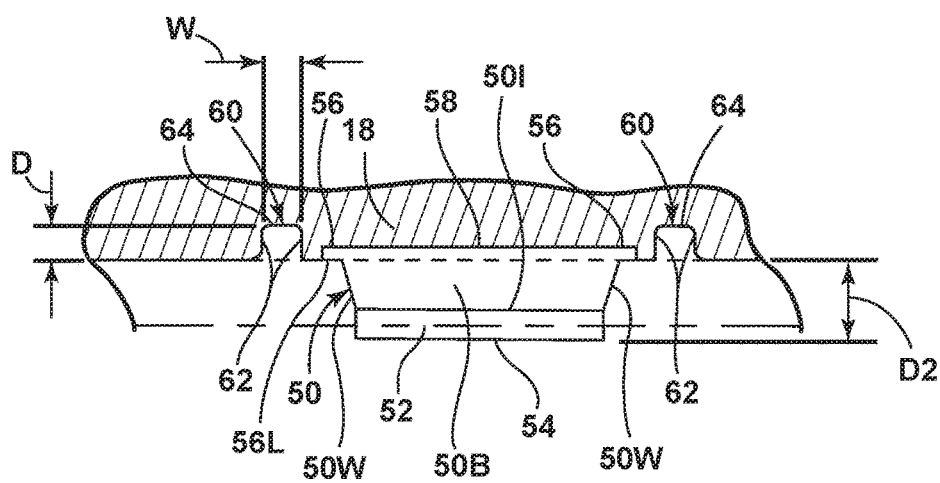
FIG. 7 is a section view of the second tread taken along line VI-VI of FIG. 6.

Referring now to FIGS. 6 and 7, the outsole 20 also includes multiple channels 60 that are upwardly recessed into the lower surface 26 of the outsole 20. The channels 60 are configured to provide localized flex in the surrounding areas so that the tread 50 can move upward. The channels 60 encircle or surround the flange 56 of each of the second treads 50. Each channel 60 can include opposed side walls 62 and a connecting top wall 64, which together define a width W and a depth D. The channels 60, and more specifically, the side walls 62 and top wall 64, can be linear, curved, angled, segmented, circular, or polygonal in cross-section. The depth D can extend partially through the thickness of the outsole 20. The width W and depth D of the channels 60 can be selected to provide a desired amount of localized flexibility in the corresponding area of the outsole 20. For example, the depth D of the channels 60 can be substantially equal to the thickness of the base 22 of the outsole 20. Alternatively, the depth D of the channels 60 can be two or three times that of the thickness of the base 22. Likewise, the width W can be selected accordingly. The channels 60 can have a width W of between about 0.1 mm to about 5 mm (e.g., 1.2 mm) and/or a depth D of between about 25% to about 75% of the thickness of the outsole 20. For example, for an outsole 20 having a thickness of 3.5 mm, the channels 60 can have a depth D of between about 0.8 mm and about 2.6 mm (e.g., a depth D of 1 mm, 2 mm, or 2.5 mm). The greater the depth and the width of the channels 60, the more localized flexibility in the corresponding area of the outsole 20, and the easier the second tread 50 can move upward.

Alternatively, as illustrated in FIGS. 9-12, the outsole 20 can include multiple ribs 70 that extend downward from the base 22 of the outsole 20. The ribs 70 encircle or surround the flange 56 of each of the second treads 50. The ribs 70 can be linear, curved, angled, segmented, circular, or polygonal in cross-section. Each rib 70 includes a width and a height. The height can extend a distance from the base 22 of the outsole 20. The width and height of the ribs 70 can be selected to provide a desired amount of localized support in the corresponding area of the outsole 20.

When the article of footwear 10 is worn, the shape of the outsole 20 can change when the wearer exerts pressure on the shoe as a result of the wearer's weight and contact with the ground surface. The shape change of the outsole 20 can allow both the first and second ground contacting surfaces 42, 54 to come into contact with the ground. More particularly, the second treads 50 are configured to move between an unloaded position, illustrated in FIGS. 3-5, and a loaded position, illustrated in FIG. 8. In the unloaded position, the first treads 40 are disposed at the first distance D1 (the distance between the first ground contacting surface 42 and the base 22) and the second treads 50 are disposed at the second distance D2 (the distance between the second ground contacting surface 54 and the base 22). The unloaded position correlates to an unloaded and/or unworn position of the treads 40, 50 and the outsole 20.

The weight of the wearer of the article of footwear 10 causes both the first and second treads 40, 50 to compress and move upward to the loaded position. In the loaded position, the first and second ground contacting surfaces 42, 54 move toward the base 22, such that the first distance D1 is reduced to a third distance D3 and the second distance D2 is reduced to a fourth distance D4, shown in FIG. 8. It should be understood that compression of the first treads 40 can be, at least in part, due to the weight of the wearer and the density of the first material. Accordingly, the difference between the unloaded first distance D1 and the loaded third distance D3 may not be significant or drastic.

The second treads 50 are configured to individually move upward toward the base 22 when the second ground contacting surface 54 engages a ground surface. The second treads 50 to move upward at least partially into the midsole 18 to the loaded position, illustrated in FIG. 8. In the loaded position, the second treads 50 at least locally compress the midsole 18 in at least an area above each second tread 50, including the flange 56, to move the second treads 50 upward from the second distance D2 to the fourth distance D4. Additionally, the channels 60 surrounding each of the second treads 50 provide localized flexibility to the outsole 20 so that each of the second treads 50 can more readily move upward toward the base 22. As such, the second ground contacting surface 54 moves upward toward the third distance D3 from the base 22, thus distributing the ground force upon both the first treads 40 and the second tread(s) 50. For example, the second treads 50 can move upward into the midsole 18 a distance of about 0.1 mm to 5.0 mm to distribute the ground force upon both the first treads 40 and the second treads 50. Optionally, the second treads 50 can move upward into the midsole a distance of about 0.5 mm to 1.5 mm. Further, the difference between the unloaded second distance D2 and the loaded fourth distance D4 may be greater the difference between the unloaded first distance D1 and the loaded third distance D3.

Figure 8:
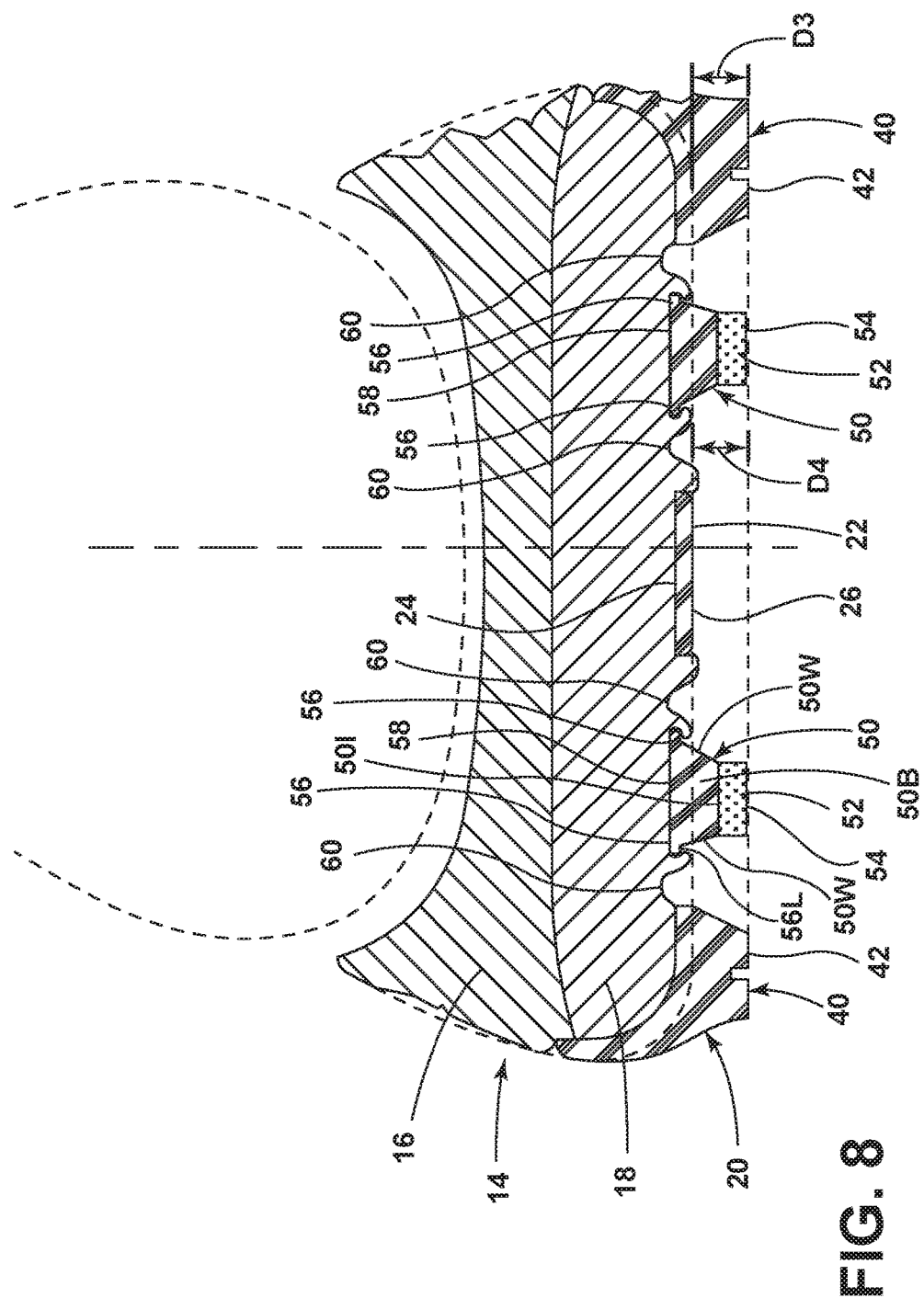
FIG. 8 is a section view of the sole assembly taken along line III-III of FIG. 1, illustrating second treads of the sole assembly disposed in a loaded position.
Figure 9:
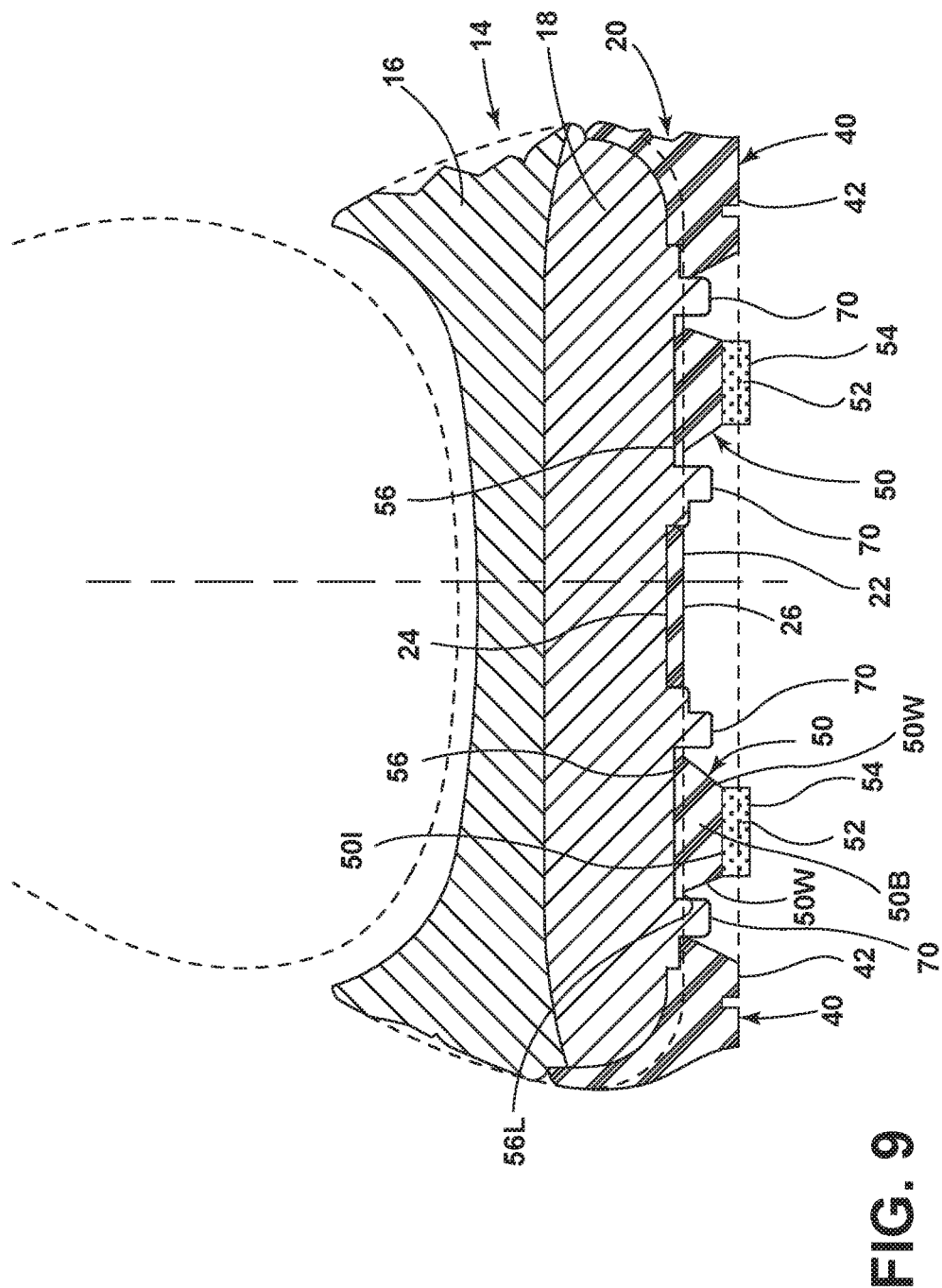
FIG. 9 is a section view of an alternative embodiment of the article of footwear, taken along a line in a location similar to line III-III of FIG. 1.
Figure 12:
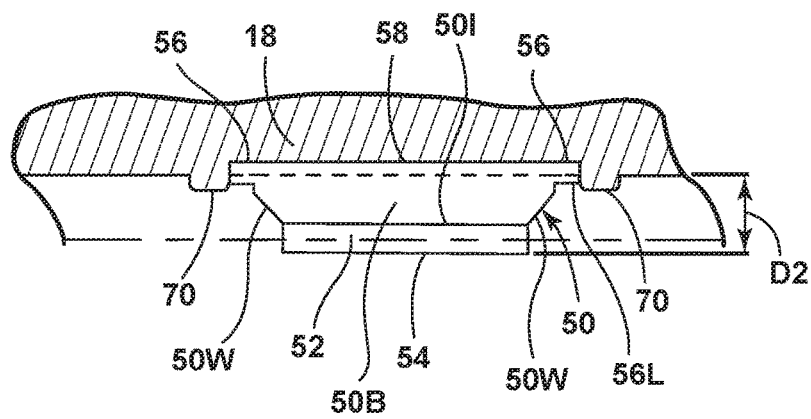
FIG. 12 is a section view of a second tread of the alternative embodiment, taken along a line in a location similar to line VI-VI of FIG. 6.

In the loaded position, illustrated in FIG. 8, the second ground contacting surface 54 is substantially even with, or approximately 0 mm below, the first ground contacting surface 42, and the third distance D3 and the fourth distance D4 of the respective first and second treads 40, 50 may be substantially equal. When the second treads 50 are disposed in the loaded position, the second material of the second tread 50 is abraded by the ground surface less than the second material would have been had the second treads 50 remained at the second distance D2 upon application of the ground force. This may improve traction on various surfaces, and, at the same time, may also improve the wear resistance of the second material on hard surfaces (e.g., pavement) before and after participating in the activities for which the footwear is suited.

It should be understood that, given the particular weight of the wearer of the article of footwear 10, that both the first treads 40 and the second treads 50 can compress the midsole, and both the treads 40 and 50 can move a distance upward toward the base 22. Because both the first and second treads 40 and 50 are constructed in majority from the first material, the first and second treads 40 and 50 will move substantially the same distance, and the first and second ground contacting surfaces 42 and 54 will remain substantially even or level with one another.

As mentioned above, the upper portion of the treads 40, 50 can be constructed of the first material, whereas the first layer 52 of the second treads 50, below the first material, can be constructed of a second material different from the first material. The selection of these materials can be based on the performance characteristics of the materials in terms of providing rigidity, wear resistance, and traction. The first material of the first treads 40 and the second treads 50 has a first durometer. The first layer 52 of the second treads 50 is constructed of the second material and has a second durometer, and the midsole 18 is constructed of a third material that has a third durometer. The first durometer is equal to or greater than the third durometer. The selection of the material's durometer provides that the midsole 18 is softer than the main portion of the treads 40, 50 so that the midsole 18 compresses first and more than the treads 40, 50. This helps the second treads 50 recess up into the midsole 18 so that the second ground contacting surface 54 is even with the first ground contacting surface 42.

The treads 40, 50 cause friction between the sole assembly 14 and the ground or surface that they contact to provide support and stability to the wearer of the article of footwear during various activities and movements. Accordingly, the traction of a particular material must be taken into consideration also. Higher density, harder materials generally provide greater wear resistance, but are slipperier and do not provide as good of traction. Oppositely, lower density, softer materials generally provide better traction, but are inherently softer and provide less wear resistance.

The first material, of which the first ground contacting surface 42 is made, has a first coefficient of static friction. The second material, from which the second ground contacting surface 52 and first layer 52 are constructed has a second coefficient of static friction The second coefficient of static friction is greater than the first coefficient of static friction. The second material, with its higher coefficient of static friction, provides improved traction yet is more susceptible to abrasion by the ground surface and is less wear resistant. The second tread 50 being able to move upward toward the base 22 also helps reduce abrasion of the second tread 50. The second material of the second tread's 50 second ground contacting surface 54 is abraded by the ground surface less than the second material would have been had the second ground contacting surface 54 remained at its unloaded position (second distance D2) upon the application of the ground force.

A slip resistance test can be performed to determine a slip index for different treads of the outsole of the embodiments herein, to thereby evaluate tread compounds helpful for navigating over icy terrain or frozen bodies of water. One method for testing footwear slip resistance is ASTM F2913-17, Standard Test Method for Measuring the Coefficient of Friction for Evaluation of Slip Performance of Footwear and Test Surfaces/Flooring Using a Whole Shoe Tester. The slip resistance test can be performed using a tribometer (also known as a slipmeter), which is an instrument that measures a degree of friction between two rubbing surfaces. The tribometer mimics biomechanical parameters of the human walking gait and replicates a heel strike of a human walking (e.g., using a leg and ankle device). Slip resistance tests can be conducted on the first and second treads 40, 50 herein, and the representative materials, in wet and dry conditions to measure a coefficient of friction between the tread and a metal surface. The ratio of slip resistance of the second tread 50, including the second material of the first layer 52, to the slip resistance of the first tread 40 may be optionally at least 2:1, further optionally, about 3:1.

Different areas of the sole assembly 14 can have specific characteristics that are designed and strategically located to accommodate wear, tear, abrasion, and force specific to each area of the sole assembly 14. For example, the first and second treads 40, 50 can be interspersed amongst one another, an example of which is depicted in FIG. 1. The positioning of the second treads 50 in particular may be strategically positioned to provide additional traction on specific areas on the bottom of the shoe where traction is of importance and/or would be relevant during certain situations. For instance, placing second treads 50 under the ball of the wearer's foot may be advantageous. This is a high pressure area under the foot, and therefore can take advantage of the increased traction provided by the second treads 50. The second treads 50 may also be placed in the heel region 38 of the article of footwear 10 and may be positioned in any suitable configuration on the outsole and in any region of the sole assembly.

The shape and orientation of the treads 40, 50 disclosed and illustrated herein may be non-symmetrical and/or irregular. This may be indicative that the shape and orientation are purposeful for more than mere aesthetics. For example, placement of the second treads 50 may indicate that applicant has found that increased traction in this area is beneficial. Further, placement of the first treads 40 may be indicative that applicant has found that greater wear resistance in this area is beneficial.

The footwear 10 as described herein offers a balanced approach to providing an outsole with both great traction and good wear resistance. The article of footwear 10 includes a sole construction configured to provide improved traction for traversing wet, slippery, and/or icy terrain, while providing good wear resistance for wear on hard surfaces. Different durometer materials of the outsole combined with the ability of the second treads to move up at least partially into the midsole provides good wear resistance, while still providing excellent traction on icy terrain features, particularly those that are wet and slippery.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z, in any number of units within those combinations.

The embodiments of the invention in which an exclusive property or privilege is claimed are defined as follows:

1. An article of footwear comprising:
   an upper; and
   an outsole joined with the upper, the outsole including a first tread and a second tread extending downward therefrom, the outsole defining a base on a lower surface of the outsole, the lower surface extending between the first and second treads;
   wherein the first tread is constructed from a first material, the first tread defining a first ground contacting surface spaced a first distance below the base;
   wherein the second tread is constructed from the first material and includes a layer of a second material below the first material, the second material being less abrasion resistant than the first material,
   wherein the second tread defines a second ground contacting surface spaced a second distance below the base, the second distance being greater than the first distance such that the second ground contacting surface of the second tread extends below the first ground contacting surface of the first tread,
   wherein the second tread is moves upward toward the base when the second ground contacting surface engages a ground surface such that the second ground contacting surface moves upward toward the first distance from the base to distribute a ground force upon both the first tread and the second tread, whereby the second material of the second tread is abraded by the ground surface less than the second material would have been had the second tread remained at the second distance upon application of the ground force.

2. The article of footwear of claim 1, wherein the second distance of the second ground contacting surface being about 0.1 mm to 5.0 mm greater than the first distance of the first ground contacting surface.

3. The article of footwear of claim 1, the outsole comprising:
a plurality of first treads and a plurality of second treads, and
a plurality of channels defined in the base,
wherein each of the plurality of channels surrounds an upper end of one of the plurality of second treads.

4. The article of footwear of claim 3 comprising:
a midsole disposed above an upper surface of the outsole.

5. The article of footwear of claim 4,
wherein the midsole is constructed of a third material having a third durometer,
wherein the first material of the plurality of first treads and the plurality of second treads has a first durometer, and the first durometer is equal to or greater than the third durometer.

6. The article of footwear of claim 5,
wherein each of the plurality of channels surrounding each of the plurality of second treads provides localized flexibility to the outsole such that each of the plurality of second treads can move upward toward the base when the second ground contacting surface engages the ground surface.

7. The article of footwear of claim 6,
wherein the second distance of the second ground contacting surface is about 0.1 mm to 5.0 mm greater than the first distance of the first ground contacting surface,
wherein the plurality of second treads move upward into the midsole, at least locally compressing the midsole, when the plurality of second treads are under a load of a wearer.

8. The article of footwear of claim 7,
wherein the midsole is constructed from a resilient material so that the plurality of second treads move upward into the midsole a distance of about 0.1 mm to 5.0 mm to distribute the ground force upon both the plurality of first treads and the plurality of second treads.

9. The article of footwear of claim 1,
wherein the ratio of the first distance to the second distance is at least 1:1.1.

10. An article of footwear comprising:
an upper;
a midsole; and
an outsole joined with the upper and disposed below the midsole, the outsole comprising:
a plurality of first treads extending downward from a lower surface of the outsole, and
a plurality of second treads extending downward from a lower surface of the outsole;
wherein the plurality of first treads is constructed from a first material having a first coefficient of static friction, the plurality of first treads defining a first ground contacting surface;

wherein the plurality of second treads is constructed from the first material and includes a layer of a second material below the first material, the second material having a second coefficient of static friction and defining a second ground contacting surface,
wherein the second coefficient of static friction is greater than the first coefficient of static friction, and the second ground contacting surface is disposed about 0.1 mm to 5.0 mm below the first ground contacting surface,
wherein the midsole is constructed from a compressible material so that the plurality of second treads move upward, upon application of a ground force, at least partially into the midsole, compressing the midsole in at least an area above the plurality of second treads until the second ground contacting surface is moved up such that the second ground contacting surface is substantially 0 mm below the first ground contacting surface.

11. The article of footwear of claim 10,
wherein the outsole includes a rib extending from the outsole and around each of the plurality of second treads.

12. The article of footwear of claim 10,
wherein the first material has a first durometer, the second material has a second durometer, and the midsole is made of a third material having a third durometer,
wherein the first durometer and the third durometer differ from one another.

13. The article of footwear of claim 12,
wherein the third durometer is greater than the first durometer.

14. The article of footwear of claim 13,
wherein the plurality of second treads are resiliently mounted below the midsole so as to compress the midsole until the second ground contacting surface is substantially even with the first ground contacting surface,
whereby a ground force is distributed upon both the plurality of first treads and the plurality of second treads, and the second material of the plurality of second treads is abraded by the ground surface less than the second material would have been had the plurality of second treads not moved upward at least partially into the midsole upon application of the ground force.

15. The article of footwear of claim 14,
wherein the first ground contacting surface of the first tread is spaced a first distance below the base, and the second ground contacting surface of the second tread is spaced a second distance below the base, and the ratio of the first distance to the second distance is at least 1:1.1.

16. An article of footwear comprising:
an upper;
a midsole; and
an outsole joined with the upper, the outsole comprising:
an arrangement of treads including a plurality of first treads interspersed amongst a plurality of second treads, and
a plurality of channels recessed into a lower surface of the outsole, wherein one of the plurality of channels surrounds an upper end of each of the plurality of second treads;
wherein the plurality of first treads is constructed from a first material and define a first ground contacting surface,
wherein the plurality of second treads is constructed from the first material and a layer of a second material below the first material, the second material defining a textured traction surface and a second ground contacting surface, wherein the second ground contacting surface is disposed 0.25 mm to 2.5 mm below the first ground contacting surface, wherein, the midsole is compressible so that upon application of a ground force when the outsole engages a ground surface, the plurality of second treads move upward into the midsole a distance of about 0.25 mm to 2.5 mm, thereby compressing the midsole in at least an area above the plurality of second treads such that the second ground contacting surface is substantially level with the first ground contacting surface, thereby distributing the ground force upon both the plurality of first treads and the plurality of second treads.

17. The article of footwear of claim 16, wherein the plurality of channels surrounding the plurality of second treads provide localized flexibility to the outsole such that each of the plurality of second treads can move upward at least partially into the midsole.

18. The article of footwear of claim 16, wherein the first material has a first coefficient of static friction, and the second material has a second coefficient of static friction greater than the first coefficient of friction.

19. The article of footwear of claim 16, wherein the midsole is constructed of a third material having a third durometer, wherein the first material of the plurality of first treads and the plurality of second treads has a first durometer, and the first durometer is equal to or greater than the third durometer.

* * * * *